United States Patent [19]

Duck

[11] 3,803,633

[45] Apr. 9, 1974

[54] METHODS, APPARATUS AND MEDIA FOR MAGNETICALLY RECORDING INFORMATION

[75] Inventor: Sherman W. Duck, Altadena, Calif.

[73] Assignee: Bell & Howell Company, Chicago, Ill.

[22] Filed: Mar. 10, 1972

[21] Appl. No.: 233,664

[52] U.S. Cl. ... 346/74 M, 346/74 MP, 179/100.2 A
[51] Int. Cl. .......... G01d 15/12
[58] Field of Search .......... 346/74 M, 74 MP; 179/100.2 A

[56] References Cited

UNITED STATES PATENTS

| | | | |
|---|---|---|---|
| 3,023,166 | 2/1962 | Duinker et al. | 179/100.2 A |
| 3,117,065 | 1/1964 | Wootten | 179/100.2 A |
| 3,320,523 | 5/1967 | Trimble | 346/74 M |
| 3,562,760 | 2/1971 | Cushner et al. | 346/74 MT |
| R25,822 | 7/1965 | Tate | 346/74 MP |
| 3,683,382 | 8/1972 | Ballinger | 346/74 M |

*Primary Examiner*—James W. Moffitt
*Attorney, Agent, or Firm*—Benoit Law Corporation

[57] ABSTRACT

Methods, apparatus and media for magnetically recording information which employ spherical, uniaxially anisotropic magnetizable particles in a matrix. The information is recorded by selectively altering the orientation of the uniaxially anisotropic particles in the matrix.

36 Claims, 16 Drawing Figures

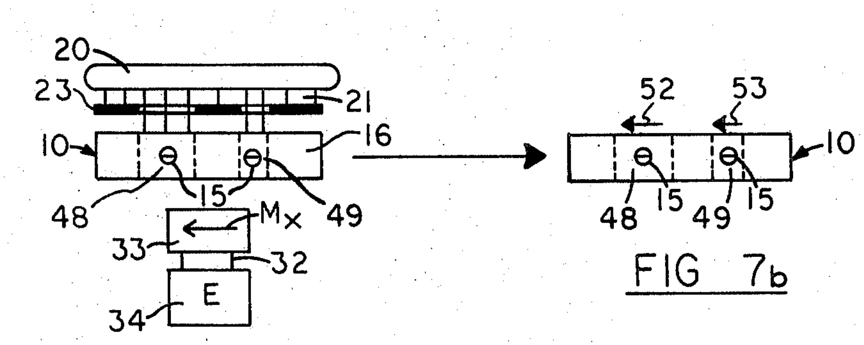
FIG 7a, FIG 7b
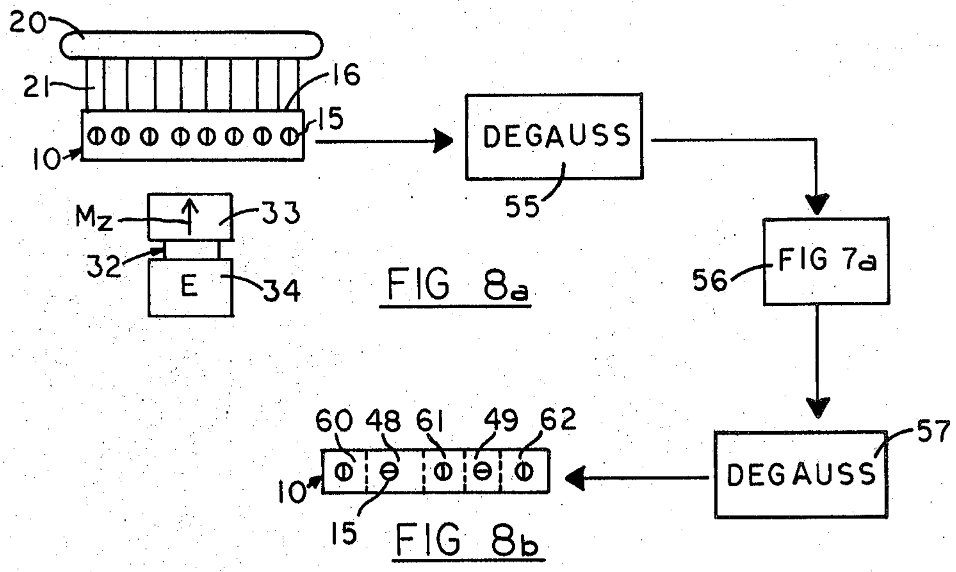
FIG 8a, FIG 8b
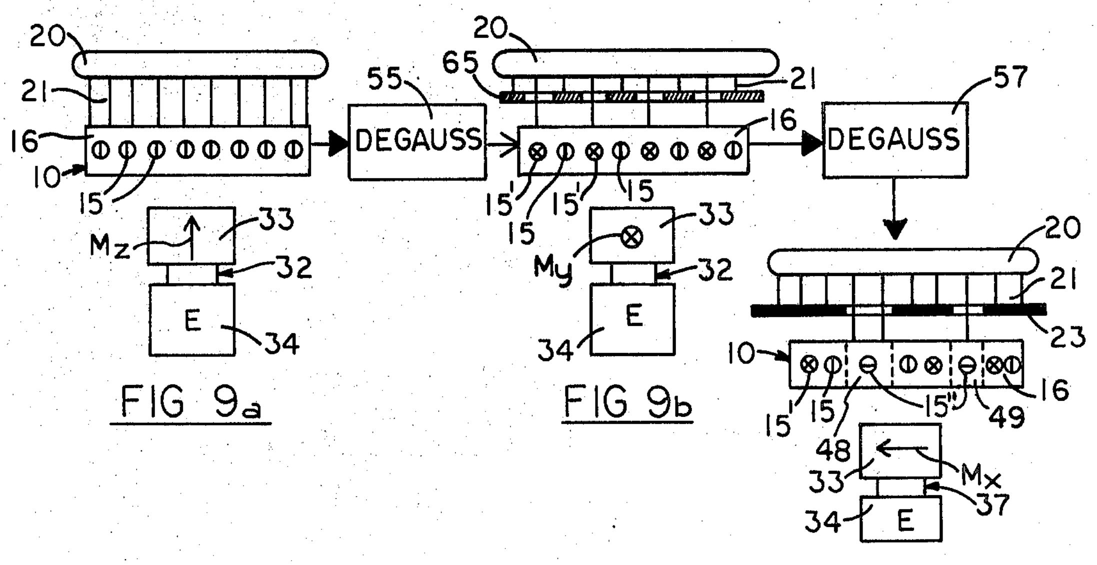
FIG 9a, FIG 9b
FIG 9c

METHODS, APPARATUS AND MEDIA FOR MAGNETICALLY RECORDING INFORMATION

CROSS-REFERENCE TO RELATED APPLICATIONS

Subject matter disclosed herein is disclosed and claimed in one or more of the following:

U.S. Pat. application Ser. No. 233,650, filed Mar. 10, 1972 and now U.S. Pat. No. 3,757,353, by Frederick J. Jeffers, and assigned to the subject assignee; and U.S. Pat. application Ser. No. 233,646, filed Mar. 10, 1972, by Frederick J. Jeffers, and assigned to the subject assignee.

BACKGROUND OF THE INVENTION

1. Field of the Invention

The subject invention relates to methods, apparatus and media for magnetically recording information and, more particularly, to methods, apparatus and media in which information is magnetically recorded by processes including a magnetic orientation of ferromagnetic particles.

2. Description of the Prior Art

There exists a considerable number of proposals according to which information is magnetically recorded by a process including an information-responsive orientation of acicular ferromagnetic particles. These proposals, while promising in principle, have not so far been commercially successful. The root of this failure appears to reside in the great difficulties that arise upon attempts to rotate acicular particles about their short axes in a viscous matrix layer.

SUMMARY OF THE INVENTION

The subject invention overcomes these disadvantages and provides novel magnetic recording methods, apparatus and media, as well as magnetic information records.

From one aspect thereof, the subject invention resides in an information recording method, comprising in combination the steps of providing spherical, magnetizable, uniaxially anisotropic particles in a matrix, and recording the information by selectively altering the axial orientation of predetermined ones of the uniaxially anisotropic particles relative to other of said particles in the matrix.

In accordance with a preferred embodiment of the subject invention, the matrix is made of a material having a first state in which the uniaxially anisotropic particles are stationary, and being transformable into a second state in which the particles are rotationally mobile.

The anisotropic particles in the matrix may be selectively magnetized and degaussed at various stages of the recording process, as will appear in the further course of this disclosure. It should, however, always be understood that utility is present upon information-wise particle orientation, since the information is recorded once the desired orientation or selective disorientation has been effected in the matrix. For instance, the information record can then be stored to be subsequently magnetized for readout or printout.

From another aspect thereof, the subject invention resides in apparatus for recording information, comprising the combination of a matrix, substantially spherical, magnetizable, uniaxially anisotropic particles in the matrix, and means operatively associated with the matrix for recording the information, said recording means including means for selectively altering the axial orientation of predetermined ones of the uniaxially anisotropic particles relative to other of said particles in the matrix.

From yet another aspect thereof, the subject invention resides in a magnetic recording medium, comprising in combination spherical, magnetizable, uniaxially anisotropic particles, and a matrix having the magnetizable particles incorporated therein, and having a first state in which the incorporated particles are substantially stationary, and being transformable into a second state in which the incorporated particles are rotationally mobile.

From a further aspect thereof, the subject invention resides in an information record, comprising in combination a matrix, a plurality of spherical, magnetizable, uniaxially anisotropic particles incorporated in the matrix and having a state of axial orientation representative of the information and a plurality of further substantially spherical, magnetizable, uniaxially anisotropic particles incorporated in said matrix and having a state of axial orientation different from said state of axial orientation representative of said information.

BRIEF DESCRIPTION OF THE DRAWINGS

The subject invention and various aspects thereof will become more readily apparent from the following detailed description of preferred embodiments of the invention, illustrated by way of example in the accompanying drawings, in which:

FIGS. 7*a* and 7*b* constitute a flow sheet depicting an information recording method in accordance with a preferred embodiment of the subject invention;

FIGS. 8*a* and 8*b* constitute a flow sheet depicting a modification of the method shown in FIGS. 7*a* and *b*, in accordance with a further preferred embodiment of the invention;

FIGS. 9*a*, 9*b* and 9*c* constitute a flow sheet depicting another modification of the method shown in FIGS. 7*a* and 7*b;*

In the accompanying drawings, like reference numerals among different figures designate like or functionally equivalent parts.

DESCRIPTION OF PREFERRED EMBODIMENTS

Figure 1:
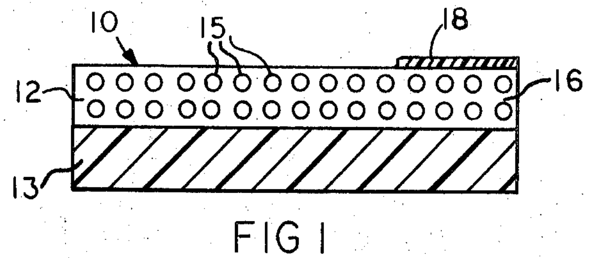
FIG. 1 is a diagrammatic longitudinal section through a recording medium according to a preferred embodiment of the subject invention.

The magnetic recording medium 10 according to the preferred embodiment of the subject invention shown in FIG. 1 includes a magnetic recording layer 12 located on a substrate 13. By way of example, and not by way of limitation, the substrate 13 may be a foil of a plastic material, such as Teflon (polytetrafluoroethylene) or "Mylar" or "Cronar" (Registered Trademarks of E.I. du Pont de Nemours & Company). Other suitable substrate materials include glass.

The magnetic recording layer 12 has magnetizable particles 15 incorporated and dispersed in a matrix 16. In accordance with the subject invention, the particles 15 are spherical and uniaxially anisotropic, as well as magnetizable.

"Uniaxial anisotropy" as herein employed refers to the type of magnetocrystalline anisotropy of a magnetizable material that is characterized by a single axis of easy magnetization or minimum internal magnetic energy, and by external magnetization minima or internal magnetic energy maxima in a plane intersecting the easy axis substantially at right angles. Uniaxial anisotropy is a well-known magnetic property and as such does not require particular elaboration. Needless to say, the uniaxial anisotropy of the particles herein employed should, of course, be high enough for an orientation effect of the type herein employed, and the particles should be magnetizable.

The expression "magnetizable" as herein employed with respect to the ferromagnetic particles refers to the well-known property of hard ferromagnetic particles of retaining an imposed magnetization after removal of the magnetic field with which the magnetization has been imposed. The expression "magnetizable" as herein employed is intended to be broad enough to cover not only particles which are to be or can be magnetized in the latter sense, but also particles which have been magnetized in the latter sense.

Preferred uniaxially anisotropic materials for the particles 15 include hexagonal cobalt, manganese bismuthide (MnBi), or a cobalt compound of the type $Co_5R$, wherein R is a rare-earth metal, such as gadolinium or yttrium which are frequently classified as rare-earth metals. Many other hard magnetic materials are, however, suitable for the practice of the subject invention.

In accordance with another preferred embodiment of the invention, the particles 15 are of single-domain size. As is well known in magnetics, the expression "single-domain" refers to the absence of Bloch walls in the particles. Due to this absence, the uniaxially anisotropic single-domain particles are rotated physically by the aligning magnetic field, rather than undergoing merely realignment of magnetic spins within the particle.

As a further requirement of the subject invention, the particles 15 are spherical in shape. This permits the particles to rotate with the least resistance as compared to acicular shapes. It also has the substantial advantage that the velocity of undesirable particle agglomeration is very substantially reduced because of the poor hydrodynamic properties of translatorily moving spherical bodies. In this respect, the center-to-center particle separation in the layer 12 preferably is in excess of about two particle diameters to curb undesirable particle agglomeration during the rotation of the particles in the fluidized matrix. Experiments have indicated that particle loading densities of as low as 4 percent by volume afford adequate toning properties for a printout of the magnetic record with the aid of magnetic toner. This loading density provides a center-to-center particle separation of about three particle diameters.

The expression "spherical" as herein employed with respect to the magnetizable particles is intended to be broad enough to cover not only perfect spheres but also those spheroids and hydrodynamically equivalent shapes which provide the magnetizable particles with rotatability and other hydrodynamic properties in the matrix which are equivalent in practice to hydrodynamic properties of particles of exact spherical shape.

The matrix 16 is of a material having a first state in which the incorporated magnetizable particles are substantially stationary, and being transformable into a second state in which the incorporated particles 15 are rotationally mobile. In principle, many materials are suitable for the matrix 16 as long as they have the requisite first state under a first condition or set of conditions, and are transformable in an information-modulated manner into the requisite second state. Typically, the transformation into the second state will not be permanent, but the matrix, upon cessation of the information-modulated influence, will revert to the first state in which the particles are again substantially stationary.

By way of example and not by way of limitation, suitable materials for the matrix 16 include acetals, acrylics, polyesters, silicones, and vinyl resins having a substantially infinite room temperature viscosity and a substantially fluid viscosity temperature of the order of about 100°C to 150°C. Other suitable materials for the matrix 16 include waxes which typically exhibit a relatively sharp melting point transition. If desired, wax and polymer mixtures may be employed.

While the subject disclosure is primarily styled in terms of matrices that are fluidizable upon thermal exposure, it should be understood that the subject invention is in no manner intended to be so limited. By way of further example, the matrix 16 may include a photosensitive material the viscosity of which is locally changeable upon a photographic exposure thereof. For instance, the matrix 12 may include a photopolymerizable material which becomes polymerized when exposed to actinic radiation. Those areas of the matrix which have not been polymerized by photographic exposure have a viscosity which can be decreased by heating, thereby permitting the particles 15 to rotate as described below. On the other hand, the regions which have become polymerized by photographic exposure will display a high viscosity, even upon heating, which inhibits a rotation of particles in those regions.

In the photosensitive embodiments of the subject invention, thermoplastic materials with photographic emulsion matrices, such as polyvinyl alcohol and gelatin, may be employed in the matrix 16. For one preferred photosensitive matrix, N-vinyl carbazone, carbon tetrabromide and 4-p-dimethylaminostyryl-quinoline is dispersed in polyvinyl alcohol. Alternatively, polyvinyl cinnamate is used as sole or partial polymer with bis(hydroxy)benzophenone as photosensitizer.

Further photosensitive embodiments may be derived from U.S. Pat. No. 2,798,960, Photoconductive Thermography, by A.J. Moncrieff-Yeates, issued July 9, 1957, and herewith incorporated by reference herein. That patent discloses several devices in which a layer of a thermoplastic material, such as a wax, is selectively fluidized by a pattern of heat gradients produced by photoconductive means that give rise to electric current patterns upon an information-wise luminous exposure.

The expression "fluidizable" as herein employed refers to a property of the matrix which renders the matrix locally transformable into a substantially liquid state, while the expression "fluid" or "fluidized" refers to such a state.

It should be recognized at this juncture that the information recording methods of the subject invention are not to be confounded with thermoplastic deformation recording processes. No peak-and-valley type deformation of the matrix 16 is striven for by the subject invention. In fact, where surface deformations assume undesirable proportions, a layer of the type fractionally shown at 18 in FIG. 1 may be employed for covering the surface of the matrix 16 and thereby inhibiting deformations thereof. The layer 18 may be of the same type of material as the substrate 13 but typically has a smaller thickness and may be transparent to the radiations to which the matrix is exposed. It should also be recognized that the actual number of particles is many times larger than the one shown in the drawings.

Figure 2:
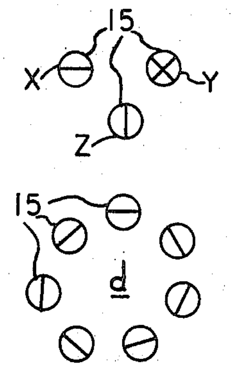
FIG. 2 is a diagrammatic illustration of particle orientations occurring in the practice of various embodiments of the subject invention.

To facilitate an understanding of the subject disclosure, preferred orientations of the uniaxially anisotropic particles 15 in the matrix 16 are symbolically illustrated in FIG. 2. These symbols concern the orientation of the magnetocrystalline "easy axis of magnetization" or minimum internal energy axis of the uniaxially anisotropic magnetizable particles 15. As may be seen from FIG. 2, an "*x*-orientation" is present if the particles are oriented parallel to an *x*-axis, which extends horizontally in the plane of the paper on which FIG. 2 is drawn. The particles have a "y-orientation" when they are oriented parallel to a *y*-axis, which extends perpendicularly through the plane of the paper. A "*z*-orientation" is present if the particles are oriented parallel to a *z*-axis, which extends vertically in the plane of the drawing paper.

FIG. 2 also diagrammatically depicts a low energy state of particles 15 which occurs when particles are magnetized and a matrix portion is fluidized so that particles are permitted to rotate and seek a low-energy state in which their net magnetic moment is minimized. In this manner the particle orientations are "randomized." While it may be true that the latter term may not strictly be applicable in its classical sense, it will be noted that the particles presently under consideration are disoriented relative to the *x*, *y* and *z*-orientations, wherefore the symbol *d* is employed for the depicted low-energy state.

Figure 4:
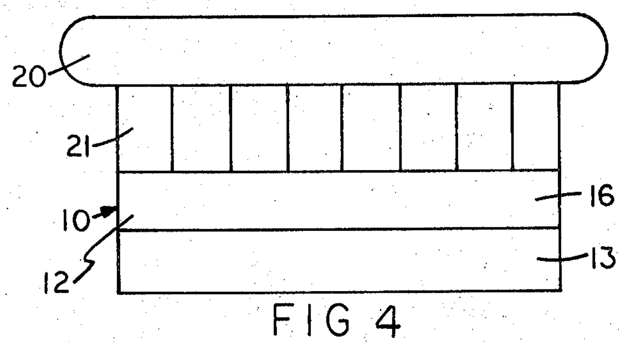
FIG. 4 is a diagrammatic elevation of a method and apparatus for exposing the recording medium of FIG. 1.

To provide for a desired orientation of particles in a particular portion of the matrix 16, a fluidization of that matrix portion is effected. If the matrix is thermally fluidizable, this is done by thermal exposure. By way of example, a source 20 of infrared radiations 21 is diagrammatically shown in FIG. 4 for thermally exposing the matrix 16.

Figure 5:
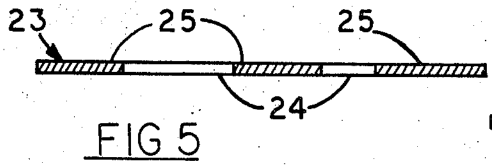
FIG. 5 is a longitudinal section through a simplified master record of information to be recorded.

If an information-wise exposure of the matrix 16 is desired, an information record of the type shown at 23 in FIG. 5 is inserted between the source 20 and recording medium 10 for an information-wise spatial modulation of the thermal radiations 21 impinging on the matrix 16. The record 23 of FIG. 5 is composed of complementary infrared-transparent and infrared-opaque portions 24 and 25, respectively, which jointly present the information to be recorded. This type of information record and information exposure technique is, of course, just one of the many well-known infrared exposure techniques (or light-exposure techniques if a photosensitive embodiment is used) that are applicable in the practice of the subject invention.

Figure 6:
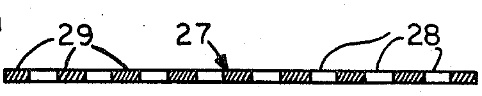
FIG. 6 is a longitudinal section through a half-tone screen that may be used in the practice of certain embodiments of the subject invention.

A half-tone screen 27 of the type shown in FIG. 6 is inserted between the source 20 and recording medium 10 if a half-tone rendition in accordance with one of the embodiments disclosed below is desired. The screen 27 is composed of alternating infrared-transparent and infrared-opaque portions 28 and 29, respectively.

In the practice of the illustrated embodiments of the subject invention, particles 15 in a fluidized matrix portion are oriented into a desired direction (*x*, *y*, or *z*) by exposing the particles to an orienting magnetic field. In the further course of this disclosure, the symbol $M_x$ is employed to designate a magnetic field that orients particles in parallel to the *x*-axis, while the symbol $M_y$ is used to designate a magnetic field that orients particles in parallel to the *y*-axis, and the symbol $M_z$ is employed to designate a magnetic field which orients particles in parallel to the *z*-axis.

Figure 3:
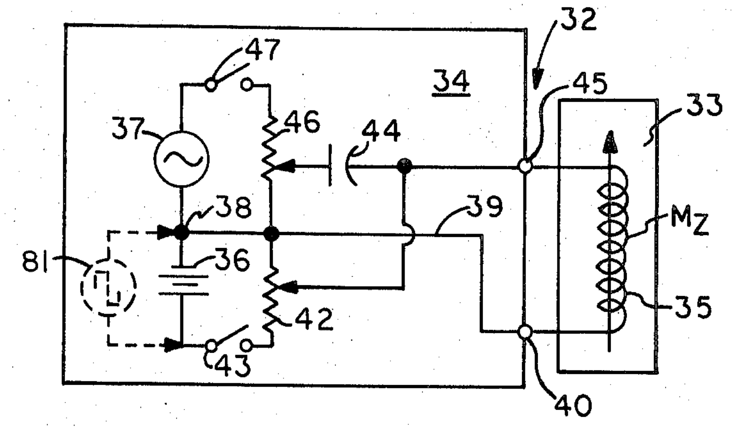
FIG. 3 is a circuit diagram of energizing and magnetizing apparatus useful in the practice of various embodiments of the subject invention.

Suitable magnetizing equipment 32 is schematically illustrated in FIG. 3. This equipment is composed of a magnetizer 33 and an energizer 34. The magnetizer 33 includes an electrically energizable magnet coil or bobbin 35. The coil 35 is symbolic for the many electromagnetic magnetizing structures that may be employed. These structures may, for instance, take the form of a solenoid or Helmholz coil that encompasses or contains the recording medium 10 (see the magnetizing coils disclosed in U.S. Pat. No. 2,793,135, by J.C. Sims et al., issued May 21, 1957, the disclosure of which is herewith incorporated by reference herein). If desired, conventional types of ferromagnetic magnetizing structures which have pole pieces that have all or part of the recording medium 10 located thereat or therebetween may be employed in the magnetizer 33. Because of the geometrical dimensions of the recording medium 10, it may be found preferable in practice to use a differently shaped magnetizing structure for the different orientation directions.

The energizer 34 of FIG. 3 provides the magnetizer 33 with electrical energizing current. To this effect, the energizer 34 includes two series-connected electric current sources 36 and 37. The source 36 may be of a conventional direct-current type. The junction 38 between the sources 36 and 37 is connected through a lead 39 to a terminal 40 of the magnetizer 33. The other terminal 45 is connected to the source 36 by way of a potentiometer 42 and a normally open switch 43. The intensity of the magnetic field provided by the magnetizer 33 is variable by adjustment of the potentiometer 42.

The terminal 45 of the magnetizer 33 is also connected to the source 37 by way of a capacitor 44, a potentiometer 46 and a normally open switch 47. The source 51 is a source of alternating current of relatively high frequency. When the switch 47 is closed, the source 37 is connected to the magnetizer 33 which then produces an alternating magnetic field with which particles 15 may be degaussed.

On the other hand, when the switch 43 is closed while the switch 47 is open, the source 36 is connected to the bobbin 35 and the magnetizer 33 provides a continuous magnetic orienting field. Magnetic particles 15 are oriented in a desired direction ($x$, $y$, or $z$) when they are exposed to the latter orienting field while the particular matrix portions are fluidized. The position of the recording medium 10 relative to the magnetizer 33 determines the direction (e.g., $x$, $y$ or $z$) in which the particles are oriented.

In all degaussing or demagnetizing operations, the source 37 may have an anhysteretically declining output. In practice, however, the amplitude of the alternating current provided by the source 37 may be constant, and the particles 25 and the magnetizer 35 may be moved relative to each other to provide the requisite anhysteretic magnetic field amplitude decrease for degaussing or magnetic erasures.

The degaussing or demagnetizing operations herein referred to are not necessarily directed to the demagnetization or degaussing of particles individually. Of course, in the case of multidomain particles, degaussing or demagnetization of particles individually is possible. However, in the case of single-domain particles, the particles are not demagnetized or degaussed individually. Rather, magnetic moments of adjacent particles are flipped into opposition to each other to provide no or only negligible net magnetic moments.

According to the preferred embodiment illustrated in FIGS. 7*a* and *b*, information-representative portions 48 and 49 of the matrix 16 are fluidized by an exposure of the recording medium 10 to thermal radiations 21 that penetrate the information master record 23. While the portions 48 and 49 are in a fluidized state, the recording medium 10 is exposed to a vectorial magnetic field $M_x$ that orients the uniaxially anisotropic particles 15 in the fluidized regions 48 and 49 in parallel to the $x$-axis.

Exposure of the recording medium 10 is then terminated whereupon the particle orientation in the regions 48 and 49 becomes "frozen" in the recording medium. If desired, this freezing may be accelerated by removing heat from the recording medium by means of a coolant or heatsink. In general, it will, however, be found that the natural loss of heat energy by the matrix to its environment is sufficient for achieving the desired freezing of effected orientation within an appropriate time. The orienting magnetic field $M_x$ is preferably only removed after the particle orientation has become frozen, lest the particles assume disorienting low-energy states under the influence of their own magnetizations.

In principle, the vectorial field $M_x$ may serve as both an orienting force and a magnetizing agency. In this case, the oriented particles 15 present considerable net magnetic moments in the regions 48 and 49.

The net magnetic moments 52 and 53 may, for instance, be read-out or printed-out. Suitable readout techniques include the conversion of the magnetic moment 52 and 53 into corresponding electrical signals by means of a magnetic playback head. The electric signals may then be processed or displayed in any desired manner by such means as conventional computer and display equipment.

If the production of one or more copies of the recorded information is desired, the magnetic moment 52 and 53 are preferably printed out with the aid of a magnetic toner.

Magnetic toners are well known in the art of magnetic printing and may include particles of iron, nickel, cobalt or ferromagnetic compositions. These ferromagnetic particles may be used as a magnetic toner for printout on a tacky surface. If printing out on a dry surface is desired, the ferromagnetic particles are preferably suspended in a toning liquid or provided with shells of fusible material. Suitable magnetic toners and toning and printout methods and equipment are, for instance, disclosed in U.S. Pat. No. 2,932,278, by J.C. Sims, issued Apr. 12, 1960, U.S. Pat. No. 2,943,908, by J.P. Hanna, issued July 5, 1960, U.S. Pat. No. 3,052,564, by F.W. Kulesza, issued Sept. 4, 1962, and U.S. Pat. No. 3,250,636, by R.A. Wilferth, issued May 10, 1966. The specifications and drawings of these patents are herewith incorporated by reference herein.

Direct printout of the magnetic record from the medium 10 provides another reason for the provision of the above mentioned top layer 18 shown in FIG. 1. In practice it will be found that the best materials for the matrix 16 in terms of selective rotatability of the particles 15 are not necessarily the best materials for a repeated printout of the resulting magnetic records. On the other hand, if a cover layer 18 is employed that is selected in terms of optimum wear and tear resistance, an extremely useful combination is obtained in which magnetic records are easily formed with the aid of a medium that would not be suitable for repeated printout, and in which repeated printout is nevertheless rendered possible by the use of a medium that would not be suitable for magnetic record establishing purposes. In practice, the layer 18 should preferably be several times thinner than the substrate 13 since the resolution and sensitivity of the printout process would suffer from too wide a separation from the particles 15.

The layer 18 is preferably transparent to the radiations (heat or light) to which the matrix 16 is exposed. Also, the layer 18 should be characterized by low lateral heat conductivity so that an undue spreading of exposing heat gradients and thus an undue reduction of recording resolution are avoided. As indicated before, the same heat-resistant material may be employed for both the substrate 13 and the cover layer 18. Where the temperatures to which the matrix 16 is exposed are relatively high, a high-temperature polyimide or polybenzamidazole may be employed in the layer 18.

Another advantageous solution for permitting multiple readout or printout resides in a transfer of the magnetic record from the medium 10 to a further magnetic recording medium (not shown). This transfer or copying of the magnetic record may be effected by placing the further recording medium into contact with the medium 10 and subjecting the further recording medium to anhysteretically alternating magnetic field of the type disclosed in U.S. Pat. No. 2,738,383, by R. Herr et al., issued Mar. 13, 1956, the specification and drawings of which are herewith incorporated by reference herein.

Alternatively, the magnetic record on the medium 10 may be copied on a low-Curie point magnetic recording medium by one of the Curie point copying methods or thermoremanent magnetization techniques disclosed, for instance, in U.S. Pat. No. 3,364,496, by J. Greiner et al., issued Jan. 16, 1968, and U.S. Pat. No. 3,496,304, by A.M. Nelson, issued Feb. 17, 1970. The specification and drawings of the Greiner et al. and Nelson patents are herewith incorporated by reference herein and it will be noted that the Nelson patent, in addition to a Curie point transfer method, also discloses an anhysteretic copy method of the type referred to above. If a Curie point copying method is employed, the low-Curie point medium is preferably heated to above its Curie point prior to being placed in proximity to the medium 10, and is rapidly cooled while in such proximity, so that adverse thermal effects on the matrix 16 are avoided. By way of example, and not by way of limitation, suitable copy materials that have reasonably low Curie points are chromium dioxide ($CrO_2$) and manganese arsenide (MnAs) ferromagnetic materials.

A further preferred embodiment of the subject invention is shown in FIGSS. 8*a* and *b*. In this connection, it should be noted that the toner image resulting from a printout of the magnetic moments 52 and 53 may be considered a negative if the transparent portions 24 of the master record 23 represent portions that are white or light in the original and if the toner particles used in the printout have a dark appearance. In some instances, the production of negatives is desired, such as in cases where the original is present in the form of a negative of which a positive copy is to be provided.

In other situations, the provision of positive prints or records is preferred.

The method presently to be discussed has the potential of providing either negative or positive records and prints, in accordance with the demands of any given situation.

According to FIG. 8*a*, the uniaxially anisotropic particles 15 in the matrix 16 are initially oriented in parallel to the *z*-axis. This orientation step is effected prior to the information exposure. By way of example, the initial orientation step of FIG. 8*a* is effected during the manufacture of the recording medium 10. Alternatively, this orientation step may be effected upon a reuse of a previously recorded medium.

To effect the initial orientation step of FIG. 8*a*, the matrix 16 is fluidized by an exposure to the thermal radiation 21. While the matrix is thus in a fluidized state, a vectorial magnetic field $M_z$ is applied by the equipment 32 to the recording medium 10 so that the particles 16 are rotated and oriented in parallel to the *z*-axis. The matrix 16 is then cooled or permitted to cool so that the *z*-orientation of the particles 15 is frozen in the matrix. The oriented recording medium 10 is thereupon subjected to a degaussing operation indicated by the block 55. Degaussing may be effected with the aid of the equipment 32 with the switch 47 closed and the magnetizer 33 moved relative to the medium 10.

The z-oriented particles 15 having been demagnetized, the recording medium 10 is now ready for an information-wise exposure of the type illustrated in FIG. 7*a*, as indicated in FIG. 8*a* by the block 56. This information-wise exposure 56 is preferably followed by a further degaussing operation 57 of the previously described type.

The resulting information record is illustrated in FIG. 8*b*. Reverting at this juncture to the above description of the method according to FIG. 7, it is easy to understand that the particles in the matrix regions 48 and 49 will be oriented in parallel to the *x*-axis after the information-wise exposure according to block 56 has been effected. By sharp contrast, the particles in the unexposed complementary matrix regions 60, 61 and 62 remain in their initial *z*-orientation. For proper degaussing, the degaussing step symbolized by the block 55 is preferably effected with the magnetizer coil 34 oriented in the *z*-direction, while the degaussing step symbolized by the block 57 should be effected with the magnetizer coil 34 oriented in the *x*-direction. If a further elimination of background magnetization is desired, each degaussing step may be effected in all three directions, *x*, *y* and *z*.

The information record shown in FIG. 8*b* is, among other things, intended to illustrate the important point that the information records according to the subject invention are not necessarily magnetic information records in every case. According to FIG. 8*b*, the recorded information is contained in an orientation of uniaxially anisotropic particles which, at that stage, may or may not be magnetized. The same applies to FIG. 7*b*. The important point to realize is that the orientation-manifested information record already has utility in an unmagnetized or demangetized state. For instance, the degaussed information record according to FIG. 8*b* may be stored, distributed or sold for subsequent magnetization and printout or readout.

Negative printouts may be obtained by subjecting the information record of FIG. 8*b* to a vectorial magnetic field $M_x$ of the type shown in FIG. 7*a*. In that case, the particles located in the regions 48 and 49 are magnetized, while the particles located in the complementary matrix regions 60, 61 and 62 remain substantially demagnetized.

Alternatively, a vectorial magnetic field $M_z$ of the type shown in FIG. 8*a* may be applied to the recording medium 10 of FIG. 8*b*, so that the particles located in the matrix regions 60, 61 and 62 are magnetized, while the particles located in the matrix regions 48 and 49 remain substantially demagnetized. In this case, net magnetic moments appear at the regions 60, 61 and 62 and a printout with dark magnetic toner results in the production of positive prints.

It should, of course, be appreciated at this point that the expressions "positive" and "negative" are syncategorematic terms and are, at any rate, not intended to limit the invention to the recording of luminous images. Rather, the preferred embodiment illustrated in FIGS. 8*a* and *b* braodly solves the age-old need for magnetic recording methods and media that are characterized by a convenient convertibility of the magnetic record to its magnetic complement.

A further preferred embodiment of the subject invention is illustrated in FIGS. 9*a*, 9*b* and 9*c*.

As illustrated in FIG. 9*a*, the recording medium 10 is exposed to the thermal radiation 21 so that the matrix 16 is transformed to its second state or liquified. The ferromagnetic particles 16 are then oriented in parallel to the *z*-axis by a vectorial magnetic field $M_z$ provided by the magnetizing equipment 32. The thermal radiation source 20 is thereupon deactivated so that the matrix 16 reverts to its first state in which the oriented particles 15 are stationary. The oriented particles 15 are thereupon degaussed as indicated by the block 55 adjacent FIG. 9*a*.

As shown in FIG. 9*b* a half-tone screen 65 is thereupon interposed between the thermal radiation source 20 and the recording medium 10. As shown in FIG. 6, the half-tone screen 65 is composed of alternating infrared-opaque portions 66 and infrared-transparent portions 67. Thermal radiations which penetrate the screen 65 fluidize alternate regions of the matrix 16, so that particles 15' in those regions can be rotated by the vectorial magnetic field $M_y$ provided by the magnetizing equipment 32 in parallel to the *y*-axis. The thermal radiation source 20 is then again deactivated so that the matrix 16 will revert to its first state in which the particle orientations are "frozen."

The result of these operations is a recording medium in which a plurality of first groups of uniaxially anisotropic particles 15 is oriented parallel to the *z*-axis, while a plurality of second groups of uniaxially anisotropic particles 15' is oriented parallel to the *y*-axis. As indicated by the block 57 adjacent the FIG. 9*b*, a degaussing step for the particles 15' is recommended prior to information-wise exposure so as to preclude an influence of residual magnetic fields on the information-wise particle orientation process.

According to FIG. 9*c*, information is recorded by orienting third groups of uniaxially anisotropic particles 15'' in parallel to the *x*-axis. According to FIG. 9*c*, this may be accomplished by subjecting the recording medium 10 to the kind of information exposure step shown in FIG. 7*a*.

As other recording media of the subject invention, the medium 10 of FIG. 9*c* again has the inherent features of complementary magnetic convertibility. Accordingly, the particles 15 and 15' may be degaussed and the particles 15'' may be magnetized to provide a magnetic record that, upon printout with a dark toner, leads to negative prints of the information contained in the master record 23.

Alternatively, the particles 15'' in the regions 48 and 49 may be degaussed and the particles 15 and 15' may be magnetized in their respective directions of axial alignment. In this manner, a magnetic record is provided that is characterized by a plurality of sharp magnetic gradients in portions of the medium 10 that are complementary to the regions 48 and 49. These sharp gradients lend themselves to an improved magnetic readout and provide in the case of a magnetic printout superior large-area fill-in and gray-scale features.

Figures 10A, 10B:
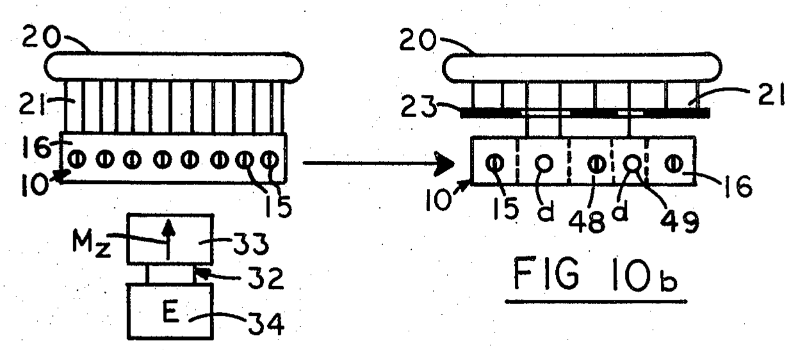
FIGS. 10*a* and 10*b* constitute a flow sheet of yet another preferred embodiment of the subject invention.
Figure 11:
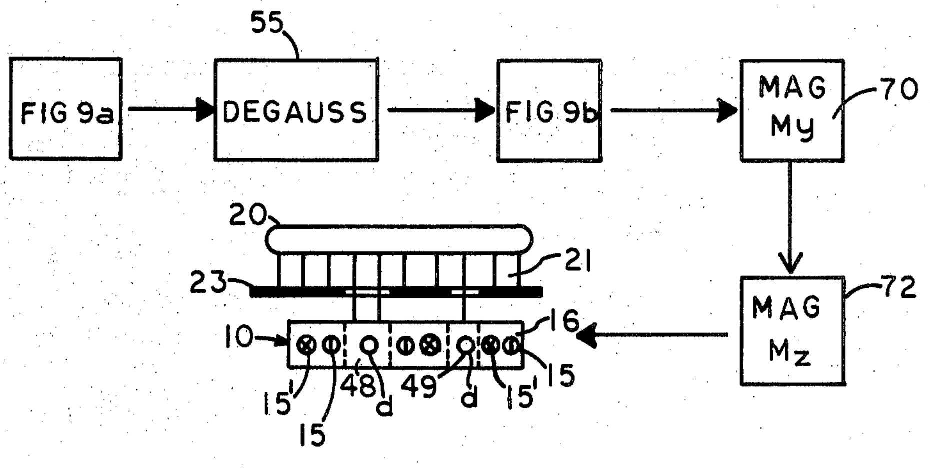
FIG. 11 is a flow sheet of a modification of the preferred embodiment of FIGS. 10*a* and 10*b*, in accordance with a further preferred embodiment of the invention.

A further preferred embodiment of the invention is shown in FIGS. 10*a* and 10*b*, and in FIG. 11.

As shown in FIG. 10*a*, the particles 15 in the matrix 16 are initially oriented in parallel to the z-axis in the general manner indicated in the first illustration of FIG. 8*a*. At this stage, the oriented particles 15 are magnetized along their easy axes of magnetization by the vectorial magnetic field $M_z$ provided by the magnetizing equipment 32. If desired, an anhysteretic magnetization of the above mentioned type may be employed. In contrast to the practice of the previously described embodiments, the oriented particles 15 are, however, *not* in a demagnetized state when the information exposure takes place.

The latter exposure is illustrated in FIG. 10*b* where thermal radiations 21 which penetrate the master information record 23 fluidize the information-representative regions 48 and 49 of the matrix 16. Since the ferromagnetic particles in the matrix 16 are in a magnetized state, a magnetic interaction between these particles is possible. In the fluidized regions 48 and 49, this interaction leads to a randomization of sorts of the particles contained in those regions.

As indicated in FIG. 2 at *d*, the result is a disorientation of the particles in the regions 48 and 49. This disorientation occurs relative to the axes *x*, *y* and *z*, and results from a natural endeavor of rotatable magnetized uniaxially anisotropic particles to seek a low-energy state in which the net magnetic moment of the particular particle groups is ideally at a minimum or, at least, much lower than the net magnetic moment of the particle groups located in the matrix portions that are complementary to the fluidized regions 48 and 49.

In this manner, a magentic record is produced in which recorded information is represented by complementary magnetic and substantially non-magnetic regions. This record may be read-out or printed-out. Printout with a dark magnetic toner will lead to positive prints of the input information or image, since substantially no toner is attracted by disoriented particle groups in the regions 48 and 49.

The embodiment of FIGS. 10*a* and *b* are particularly advantageous from a practical point of view, since the process of FIG. 10*a* may be effected by the manufacturer of the recording medium 10 so that no magnetizing equipment whatever is needed by the user who effects the information-representative exposure according to FIG. 10*b*. The energy which is provided by electrostatic equipment in contemporary xerographic copier is in accordance with a preferred embodiment of FIG. 10*a* provided in magnetically built-in form by the manufacturer, whereby the equipment needed by the user is very considerably simplified.

The further preferred embodiment of FIG. 11 starts out with the initial orientation step of FIG. 9*a* in which the particles 15 in the matrix 16 are oriented parallel to the *z*-axis. The oriented particles 15 are then preferably degaussed as indicated by the block 55. The recording medium 10 is thereupon subjected to the processing step of FIG. 9*b*, the result of which is a recording medium in which first groups of *z*-oriented particles 15 alternate with second groups of *y*-oriented particles 15'. If the *y*-oriented particles 15' are not already magnetized during the orientation step of FIG. 9*b* they may, as indicated by the block 70, be magnetized along their easy axes of magnetization. Similarly, the *z*-oriented particles 15 are magnetized along their easy axes of magnetization, as diagrammatically indicated by the block 72 in FIG. 11.

The resulting magnetic recording medium is exposed as shown at the end of the flow-sheet of FIG. 11 to thermal radiations that penetrate the master information record 23. The ensuing fluidization of the matrix regions 48 and 49 again permits magnetized particles contained therein to seek a low-energy state of the type shown at *d* FIG. 2 and discussed above in connection with FIG. 10*b*. In this manner, a magnetic information record is obtained in which substantially demagnetized regions 48 and 49 contrast with complementary magentized record portions which, by virtue of the different orientations of the particles 15 and 15', are characterized by a plurality of magnetic gradients which improve magnetic readout and provide large-area fill-in and gray-scale rendition during magnetic toner printout.

All the steps down to and including the magnetizing step indicated by the block 72 may be effected by the manufacturer of the recording medium, so that the user does not need any expensive magnetizing equipment for carrying out the simple information exposure step shown at the end of the flow-sheet of FIG. 11

As an alternative to the provision of large-area fill-in and/or gray scale rendition by particle orientation as shown, for instance, in FIG. 9*b*, it is possible to provide an alternatingly-poled magnetic line pattern with an alternating-current energized magnetic recording device. As shown in dotted lines in FIG. 3 at 81, the direct-current source 36 may be replaced by an alternating-current source (square wave or sine-wave generator). When energized by the source 81, the magnetizer 33 is moved relative to the recording medium 10, so that an alternatingly-poled magnetic line pattern is recorded.

In terms of FIG. 8*b*, for instance, the magnetizer 33 energized by the source 81 may be moved relative to the medium 10 while oriented in the *z*-direction. In this manner, particles in the matrix portions 60, 61 and 62 will be magnetized with spatially alternating magnetic polarities.

Substantially the same effect is obtained in the embodiment of FIG. 10*b* when the magnetizer 33 is energized, oriented and moved as just described with reference to FIG. 8*b*.

It will now be recognized that the subject invention provides a multitude of highly advanced information recording methods, apparatus and media, and information records, which are characterized by a high degree of utility and versatility.

I claim:

1. In an information recording method, the improvement comprising in combination the steps of:

providing substantially spherical, magnetizable, uniaxially anisotropic particles in a matrix; and recording said information by selectively altering the axial orientation of predetermined ones of said uniaxially anisotropic particles relative to other of said particles in said matrix.

2. A method as claimed in claim 1, wherein:

said particles are single-domain particles.

3. A method as claimed in claim 1, wherein:

said particles are made of a material selected from the group consisting of hexagonal cobalt, manganese bismuthide (MnBi), and $Co_5R$, wherein R is a rare-earth metal.

4. A method as claimed in claim 3, wherein:

said particles are single-domain particles.

5. A method as claimed in claim 1, wherein:

said matrix is made of a material having a first state in which said particles are substantially stationary, and being transformable into a second state in which said particles are rotationally mobile; and portions of said matrix are temporarily transformed into said second state and uniaxially anisotropic particles in said temporarily transformed matrix portions are rotated to provide groups of axially aligned particles representative of said information.

6. A method as claimed in claim 5, including the further step of:

magnetizing said groups of axially aligned particles to provide a magnetic record of said information.

7. A method as claimed in claim 1, wherein:

said matrix is made of a material having a first state in which said particles are substantially stationary, and being transformable into a second state in which said particles are rotationally mobile;

portions of said matrix are temporarily transformed into said second state and uniaxially anisotropic particles in said temporarily transformed matrix portions are rotated to provide groups of axially aligned particles representative of said information; and uniaxially anisotropic particles in said matrix other than said axially aligned particles in said groups are magnetized to provide a magnetic record of said information.

8. A method as claimed in claim 1, wherein:

said uniaxially anisotropic particles are initially oriented parallel to a predetermined axis; and said information is recorded by selectively altering said orientation.

9. A method as claimed in claim 1, wherein:

said uniaxially anisotropic particles are initially oriented parallel to a predetermined first axis; and said information is recorded by rotating groups of uniaxially anisotropic particles into alignment in parallel to a second axis.

10. A method as claimed in claim 9, wherein:

said groups of uniaxially anisotropic particles are magnetized to provide a magnetic record of said information.

11. A method as claimed in claim 9, wherein:

uniaxially anisotropic particles oriented parallel to said first axis are magnetized to provide a magnetic record of said information.

12. A method as claimed in claim 1, wherein:

a plurality of first groups of said uniaxially anisotropic particles are initially oriented parallel to a first axis;

a plurality of second groups of said uniaxially anisotropic particles are initially oriented parallel to a second axis; and said information is recorded by orienting third groups of said uniaxially anisotropic particles parallel to a third axis.

13. A method as claimed in claim 12, wherein:

uniaxial particles in said third groups are magnetized to provide a magnetic record of said information.

14. A method as claimed in claim 12, wherein:

uniaxial particles in said third groups are substantially demagnetized, and uniaxial particles in said first and second groups are magnetized to provide a magnetic record of said information.

15. A method as claimed in claim 1, wherein:

uniaxially anisotropic particles in said matrix are initially oriented and magnetized; and said information is recorded by selectively disorienting groups of said magnetized particles to decrease the net magnetic moments in said groups.

16. A method as claimed in claim 1, wherein:

said matrix is made of a material having a first state in which said particles are substantially stationary, and being transformable into a second state in which said particles are rotationally mobile;

uniaxially anisotropic particles in said matrix are initially oriented and magnetized; and information-representative portions of said matrix are temporarily transformed into said second state so that uniaxially anisotropic particles in said portions rotate under the influence of their magnetization to decrease the net magnetic moments in the temporarily transformed matrix portion.

17. In apparatus for recording information, the combination comprising:

a matrix;

substantially spherical, magnetizable, uniaxially anisotropic particles in said matrix; and means operatively associated with said matrix for recording said information, said recording means including means for selectively altering the axial orientation of predetermined ones of said uniaxially anisotropic particles relative to other of said particles in said matrix.

18. A method as claimed in claim 17, wherein:

said particles are single-domain particles.

19. Apparatus as claimed in claim 17, wherein:

said particles are of a material selected from the group consisting of hexagonal cobalt, manganese bismuthide (MnBi), and $Co_5R$, wherein R is a rare-earth metal.

20. A method as claimed in claim 19, wherein:

said particles are single-domain particles.

21. Apparatus as claimed in claim 17, wherein:

said matrix has a first state in which said particles are substantially stationary, and is transformable into a second state in which said particles are rotationally mobile; and said recording means include means operatively associated with said matrix for temporarily transforming information-representative matrix portions into said second state, and means operatively associated with particles in said matrix for rotating uniaxially anisotropic particles in said temporarily transformed matrix portions to provide information-representative groups of axially aligned particles.

22. Apparatus as claimed in claim 21, including:

means operatively associated with particles in said matrix for magnetizing said groups of axially aligned particles to provide a magnetic record of said information.

23. Apparatus as claimed in claim 21, including:

means operatively associated with particles in said matrix for magnetizing particles in said matrix other than said groups of axially aligned particles to provide a magnetic record of said information.

24. Apparatus as claimed in claim 17, including:

means operatively associated with particles in said matrix for initially orienting and magnetizing uniaxially anisotropic particles in said matrix; and said recording means including means for selectively disorienting, in response to said information, groups of said magnetized particles to decrease the net magnetic moment of substantially each of said groups.

25. Apparatus as claimed in claim 17, wherein:

said matrix has a first state in which said particles are substantially stationary, and is transformable into a second state in which said particles are rotationally mobile;

said apparatus including means for initially orienting and magnetizing uniaxially anisotropic particles in said matrix; and said recording means include means for temporarily transforming information-representative portions of said matrix into said second state whereby uniaxially anisotropic particles in said portions rotate under the influence of their magnetization to decrease the net magnetic moments in temporarily transformed matrix portions.

26. A recording medium, comprising in combination:

substantially spherical, magnetizable, uniaxially anisotropic particles; and a matrix having said particles incorporated therein, and having a first state in which said incorporated particles are substantially stationary, and being transformable into a second state in which said incorporated particles are rotationally mobile.

27. A recording medium as claimed in claim 26, wherein:

said particles are single-domain particles.

28. A recording medium as claimed in claim 26, wherein:

said particles are of a material selected from the group consisting of hexagonal cobalt, manganese bismuthide (MnBi), and $Co_5R$, wherein R is a rare-earth metal.

29. A recording medium as claimed in claim 28, wherein:

said particles are single-domain particles.

30. A recording medium as claimed in claim 26, wherein:

said incorporated uniaxially anisotropic particles are in an oriented state.

31. A recording medium as claimed in claim 30, wherein:

a plurality of first groups of said incorporated uniaxially anisotropic particles are oriented parallel to a first axis; and a plurality of second groups of said incorporated uniaxially anisotropic particles are oriented parallel to a second axis.

32. A recording medium as claimed in claim 26, wherein:

said incorporated uniaxially anisotropic particles are in an oriented and magnetized state.

33. An information record, comprising in combination:

a matrix;

a plurality of substantially spherical, magnetizable, uniaxially anisotropic particles incorporated in said matrix and having a state of axial orientation representative of said information; and a plurality of further substantially spherical, magnetizable, uniaxially anisotropic particles incorporated in said matrix and having a state of axial orintation different from said state of axial orientation re-presentative of said information.

34. An information record as claimed in claim 33, wherein:

said particles are single-domain particles.

35. An information record as claimed in claim 33, wherein:

said pluralities of particles include first uniaxially anisotropic oriented and magnetized particles; and groups of second uniaxially anisotropic particles being disoriented relative to said first particles and having a lower net magnetic moment than said first particles.

36. An information record as claimed in claim 33, wherein:

said pluralities of particles include first groups of magnetized particles oriented parallel to a first axis, second groups of magnetized particles oriented parallel to a second axis and alternating with said first groups; and third groups of particles being disoriented relative to said first and second groups and having lower net magnetic moments than said first and second groups.

* * * * *